(12) United States Patent
Sun et al.

(10) Patent No.: US 10,234,735 B2
(45) Date of Patent: Mar. 19, 2019

(54) DISPLAY DEVICE

(71) Applicants: BOE TECHNOLOGY GROUP CO., LTD., Beijing (CN); HEFEI BOE DISPLAY LIGHTING CO., LTD., Hefei, Anhui (CN)

(72) Inventors: Wenbo Sun, Beijing (CN); Qiping Zhang, Beijing (CN); Jitai Xia, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 22 days.

(21) Appl. No.: 15/567,274

(22) PCT Filed: Apr. 12, 2017

(86) PCT No.: PCT/CN2017/080237
§ 371 (c)(1),
(2) Date: Oct. 17, 2017

(87) PCT Pub. No.: WO2018/028231
PCT Pub. Date: Feb. 15, 2018

(65) Prior Publication Data
US 2018/0292697 A1    Oct. 11, 2018

(30) Foreign Application Priority Data

Aug. 11, 2016 (CN) .......................... 2016 1 0659042

(51) Int. Cl.
*G02F 1/1345* (2006.01)
*G02F 1/1333* (2006.01)

(52) U.S. Cl.
CPC ........ *G02F 1/13452* (2013.01); *G02F 1/1333* (2013.01); *G02F 1/133308* (2013.01)

(58) Field of Classification Search
CPC ... G02F 1/13452; G02F 1/1333; G02F 1/1333
See application file for complete search history.

(56) References Cited

U.S. PATENT DOCUMENTS

2009/0047806 A1    2/2009 Azuma et al.
2009/0153778 A1*   6/2009 Nakaya ................ G02B 6/0088
                                                          349/65

(Continued)

FOREIGN PATENT DOCUMENTS

CN    101551539 A    10/2009
CN    201368951 Y    12/2009

(Continued)

OTHER PUBLICATIONS

International Search Report and Written Opinion dated Jul. 21, 2017; PCT/CN2017/080237.

*Primary Examiner* — Pete T Lee
(74) *Attorney, Agent, or Firm* — Ladas & Parry LLP

(57) ABSTRACT

A display device is provided. The display device includes a display panel, an electronic element, a flexible circuit board, a frame and a roller. The electronic element is located outside the display panel; the flexible circuit board connects the display panel to the electronic element; the frame includes a protrusion portion extending out of the display panel, the protrusion portion overlaps with a portion of the flexible circuit board located between the display panel and the electronic element; and at a position where the flexible circuit board overlaps with the protrusion portion of the frame, the roller is disposed between the flexible circuit board and the protrusion portion.

17 Claims, 3 Drawing Sheets

(56) References Cited

U.S. PATENT DOCUMENTS

2016/0066449 A1\* 3/2016 Hsiao ................ G02F 1/133308
                                                            361/679.01
2017/0031388 A1\* 2/2017 Han ..................... G06F 1/1652

FOREIGN PATENT DOCUMENTS

| CN | 101846826 A | 9/2010 |
| CN | 105044953 A | 11/2015 |
| CN | 205880426 A | 1/2017 |

\* cited by examiner

DISPLAY DEVICE

TECHNICAL FIELD

Embodiments of the present disclosure relate to a display device.

BACKGROUND

In recent years, liquid crystal display (LCD) is widely applied in various electronic products. The liquid crystal display mainly includes a liquid crystal display panel and a backlight source used for providing a backlight for the liquid crystal display panel. The backlight source includes the structures such as a back plate, a light source, a frame and an optical film and the like.

In the LCD, in order to reduce a width of the frame, a bendable flexible circuit board is provided at the frame to realize signal transmission. For example, at the frame of the backlight source, the liquid crystal display panel and the printed circuit board (PCB) are connected by a bendable chip on film (COF); in this way, the PCB provides a control signal to the liquid crystal display panel by the COF, so as to drive the liquid crystal display panel to display.

SUMMARY

According to embodiments of the disclosure, a display device is provided. The display device comprises: a display panel; an electronic element, located outside the display panel; a flexible circuit board, connecting the display panel to the electronic element; a frame, including a protrusion portion extending out of the display panel, wherein the protrusion portion overlaps with a portion of the flexible circuit board located between the display panel and the electronic element; and a roller, wherein at a position where the flexible circuit board overlaps with the protrusion portion of the frame, the roller is disposed between the flexible circuit board and the protrusion portion.

For example, the portion of the flexible circuit board located between the display panel and the electronic element spans across the protrusion portion of the frame.

For example, the protrusion portion of the frame includes a surface facing the flexible circuit board, and a distance between the surface and the roller is greater than or equal to 0.

For example, in a direction parallel with a main surface of the display panel, the display panel and the electronic element are respectively located on both sides of the protrusion portion of the frame.

For example, in a direction perpendicular to the main surface of the display panel, a top end of the roller is higher than the protrusion portion of the frame.

For example, the roller and the flexible circuit board are in contact.

For example, a tangential line at the position where the roller and the flexible circuit board are in contact faces the electronic element or the display panel.

For example, the roller includes a rotatable shaft disposed on the frame and a sleeve surrounding the rotatable shaft.

For example, the frame is provided with a concave portion therein, the concave portion has a first side wall and a second side wall opposite to each other, and two ends of the rotatable shaft of the roller are respectively disposed on the first side wall and the second side wall.

For example, along an extension direction of the sleeve, a length of the sleeve is greater than a length of the flexible circuit board.

For example, a unidirectional gap between an inner wall of the sleeve and the rotatable shaft is less than or equal to about 0.2 mm.

For example, a material of the sleeve includes polyvinyl chloride or silicone.

For example, a material of the rotatable shaft includes metal.

For example, the protrusion portion of the frame includes a first portion, a second portion and a third portion which are sequentially connected to form a stepwise structure, and the first portion is located between the second portion and the display panel.

For example, the third portion is lower than the first portion and the roller is disposed on the third portion.

For example, the frame further includes a side frame connected to the protrusion portion, and the electronic element is parallel with the side frame.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Expressions such as "include" or "comprise"

and the like denote that elements or objects appearing before the words of "include" or "comprise" cover the elements or the objects enumerated after the words of "include" or "comprise" or equivalents thereof, not exclusive of other elements or objects. Expressions such as "connect" or "interconnect" and the like are not limited to physical or mechanical connections, but may include electrical connections, whether direct or indirect. Expressions such as "up", "down", "left", "right" and the like are only used for expressing relative positional relationship, the relative positional relationship may be correspondingly changed in the case that the absolute position of a described object is changed.

Figure 1:
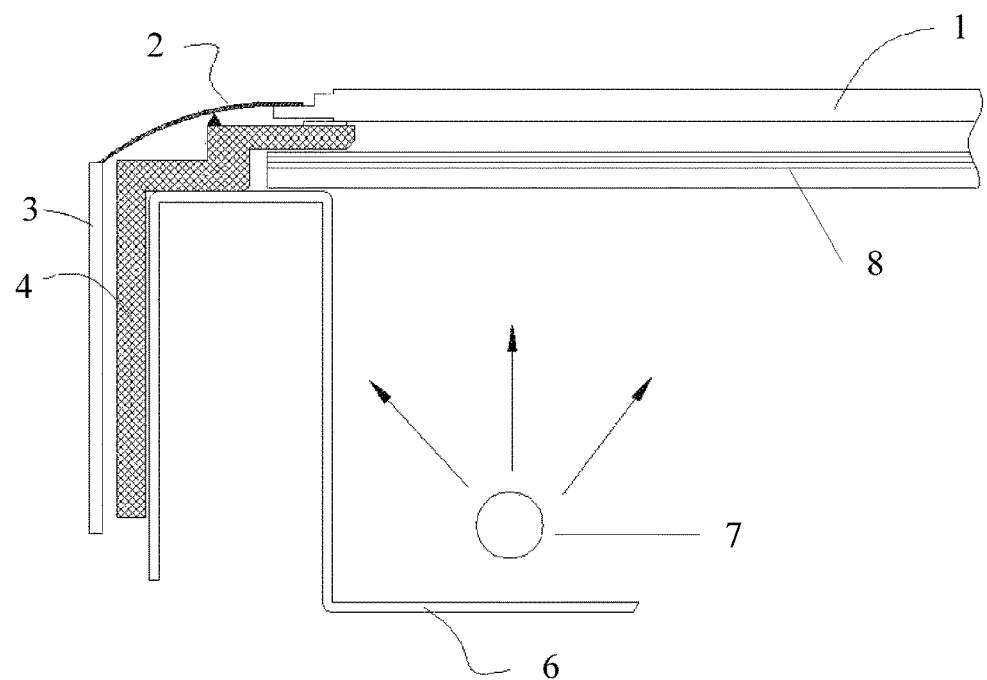
FIG. 1 is a structural schematic view illustrating a liquid crystal display (LCD) according to one technique.

FIG. 1 is a structural schematic view illustrating a liquid crystal display (LCD) according to one technique. As shown in FIG. 1, the LCD includes a liquid crystal display pane 11, a printed circuit board (PCB) 3, a chip on film (COF) 2 for connecting the liquid crystal display panel 1 with the PCB 3, and a backlight source providing a backlight for the liquid crystal display panel 1, and the backlight source includes a back plate 6, a light source 7 disposed on the back plate 6, an optical film 8 and a frame 4.

In research, inventors of the present disclosure note that in the LCD as shown in FIG. 1, in a direction perpendicular to a main surface of the liquid crystal display panel 1, the main surface of the liquid crystal display panel 1 is higher than the frame 4; after assembling is finished, due to a traction action of the PCB 3 to the COF 2, the COF 2 is in direct contact with the frame 4 at the black Δ position shown in FIG. 1; as a result, for example in a transportation process or a vibration process (for example, a vibration experiment process), direct physical friction occurs between the COF 2 and the frame 4; and especially in the vibration process, the COF 2 is repeatedly collided by the frame 4. Therefore, in the LCD as shown in FIG. 1, a probability that the COF 2 is scratched and damaged due to the friction is higher, a probability of circuit fault caused thereby is higher, and an economic loss caused thereby is hard to control.

Figure 2:
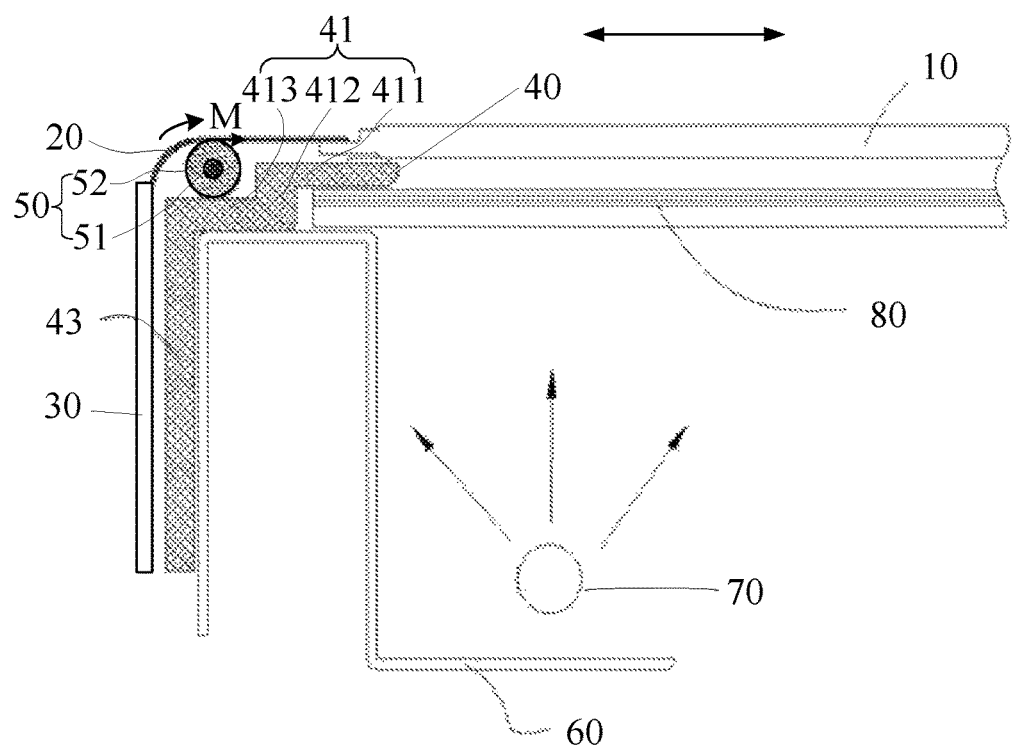
FIG. 2 is a structural schematic view illustrating a display device provided by embodiments of the present disclosure.

At least one embodiment of the present disclosure provides a display device, as shown in FIG. 2, the display device comprises a display panel 10, a flexible circuit board 20, an electronic element 30, a frame 40 and a roller 50. The electronic element 30 is located outside the display panel 10; the flexible circuit board 20 connects the display panel 10 to the electronic element 30; the frame 40 includes a protrusion portion 41 extending out of the display panel 10, and the protrusion portion 41 overlaps with a portion of the flexible circuit board 20 located between the display panel 10 and the electronic element 30; and at a position where the flexible circuit board 20 and the protrusion portion 41 of the frame 40 are overlapped, the roller 50 is disposed between the flexible circuit board 20 and the protrusion portion 41.

In the display device provided by the embodiments of the present disclosure, the roller 50 is disposed between the flexible circuit board 20 and the frame 40, and the roller 50 is capable of roll with respect to the flexible circuit board 20 and the frame 40, therefore, for example, in the transportation or the vibration process (for example, the vibration experiment process), a rolling friction occurs between the flexible circuit board 20 and the roller 50 in a direction from the display panel 10 to the electronic element 30. Therefore, compared with the sliding friction between the chip on film 2 and the frame 4 in the structure as shown in FIG. 1, the embodiments of the present disclosure effectively reduce the friction force applied to the flexible circuit board 20 and effectively reduce the probability of damage to the flexible circuit board 20 caused by the friction, thereby reducing circuit fault and saving cost.

For example, the electronic element 30 is a printed circuit board (PCB), for example a hard PCB.

For example, the flexible circuit board 20 is a chip on film (COF) or a tape carrier package (TCP, i.e., a flexible belt type circuit board mounted with a drive chip). Of course, the flexible circuit board 20 may be other types of flexible circuit boards.

For example, the portion of the flexible circuit board 20 located between the display panel 10 and the electronic element 30 spans across the protrusion portion 41 of the frame 40, that is to say, along a direction parallel with a main surface of the display panel 10 (as shown by double arrows in FIG. 2), an end portion of the flexible circuit board 20 connected to the electronic element 30 extends beyond an end portion of the protrusion portion 40 away from the display panel 10. For example, in such a case, the electronic element 30 is suspended in air. For example, the frame 40 further includes a side frame 43 connected to the protrusion portion 41, and the electronic element 30 is parallel with the side frame 43.

For example, the display device provided by the embodiments of the present disclosure is a liquid crystal display (LCD), in such a case, the display panel 10 is a liquid crystal display panel. For example, the display device provided by the embodiments of the present disclosure further comprises a back plate 60 supporting the frame 40, a light source 70 disposed on the back plate 60 and an optical film 80, the back plate 60, the light source 70, the optical film 80 and the frame 40 form a backlight source of the display device, and the backlight source provides a backlight for the display panel 10. Of course, the display device provided by the embodiments of the present disclosure may be other types of display devices having the display panel 10 connected to the electronic element 30 by the flexible circuit board 20.

For example, the frame 40 is disposed on a back side of the display panel 10 and used for limiting a position between the display panel 10 and the optical film 80. For example, the protrusion portion 41 of the frame 40 includes a first portion 411, a second portion 412 and a third portion 413 which are sequentially connected to form a stepwise structure, and the first portion 411 is located between the second portion 412 and the display panel 10. For example, the third portion 413 is lower than the first portion 411, and the roller 50 is disposed on the third portion 413, therefore, the roller 50 avoids the friction between a joint between the first portion 411 and the second portion 412 and the flexible circuit board 20.

For example, in a direction parallel with the main surface of the display panel 10 (as shown by double arrows in FIG. 2), the display panel 10 and the electronic element 30 are respectively located on both sides of the protrusion portion 41 of the frame 40. For example, in such a case, in a direction perpendicular to the main surface of the display panel 10, a top end M of the roller 50 is higher than the protrusion portion 41 of the frame 40 (for example, higher than the joint between the first portion 411 and the second portion 412), in this way, the roller 50 more effectively avoids the friction between the flexible circuit board 20 and the frame 40.

For example, the roller 50 is in direct contact with the flexible circuit board 20. Thus, it is favorable to generate the rolling friction between the roller 50 and the flexible circuit board 20 for example in the transportation process or vibration process.

For example, in the case that the flexible circuit board 20 moves toward the display panel 10 for reasons such as vibration, due to the action of the rolling friction force between the flexible circuit board 20 and the roller 50, a rolling direction of the roller 50 is as shown by a curve arrow in FIG. 2, that is to say, a tangential line at the position where the roller 50 and the flexible circuit board 20 are in contact (as shown by a linear arrow at the M position in FIG. 2) faces the display panel. Similarly, in the case that the flexible circuit board 20 moves toward the electronic element 30, the tangential line faces the electronic element 30. Therefore, the tangential line at the position where the roller 50 and the flexible circuit board 20 are in contact faces the electronic element 30 or the display panel 10.

Figure 3:
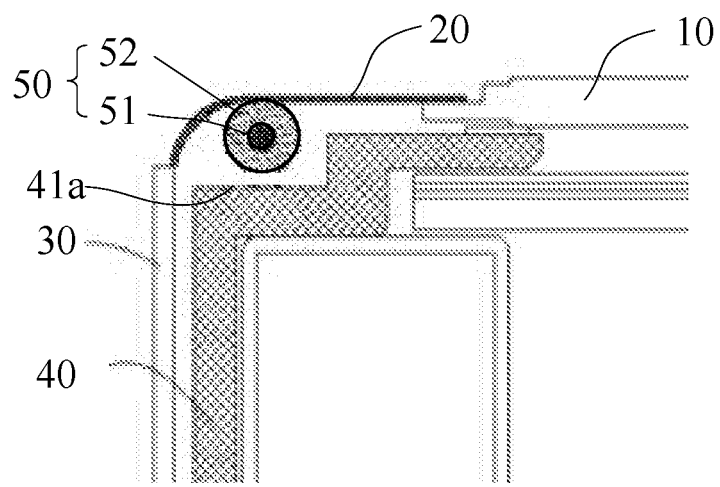
FIG. 3 is a structural schematic view illustrating another display device provided by the embodiments of the present disclosure.

In the embodiments as shown in FIG. 2, the roller 50 makes contact with the surface of the protrusion portion 41 facing the flexible circuit board 2. Of course, the embodiments of the present disclosure includes but not limited to FIG. 2. For example, in at least one embodiment of the present disclosure, as shown in FIG. 3, the protrusion portion 41 of the frame 40 includes a surface 41a facing the flexible circuit board 20, and a distance between the surface 41a and the roller 50 is greater than 0. In the embodiments as shown in FIG. 3, by disposing the roller 50 and the surface 41a of the frame 40 with a gap therebetween, it is favorable for the roller 50 to roll.

For example, the roller 50 is a rolling wheel structure, as shown in FIGS. 2 and 3, in the case that the roller 50 is the rolling wheel structure, the roller 50 includes a rotatable shaft 51 disposed on the frame 40 and a sleeve 52 surrounding the rotatable shaft 51. For example, the rotatable shaft 51 is cylinder, and the sleeve 52 is a circular pipe; in this way, it is favorable for the roller 50 to roll.

For example, a material of the sleeve 52 is flexible, for example, the sleeve 52 is a silicone pipe or a soft plastic pipe. For example, the material of the sleeve 52 includes polyvinyl chloride (PVC) or silicone. By adopting the flexible material to form the sleeve 52, physical collision is effectively prevented from occurring between the sleeve 52 and the flexible circuit board 20 in the transportation process or the vibration process, therefore, the damage to the flexible circuit board 20 is effectively avoided.

For example, a material of the rotatable shaft 51 is rigid, for example, the material of the rotatable shaft 51 includes metal, for example stainless steel.

The rolling wheel will be explained in detail in combination with FIGS. 4a to 4c.

Figure 4A:
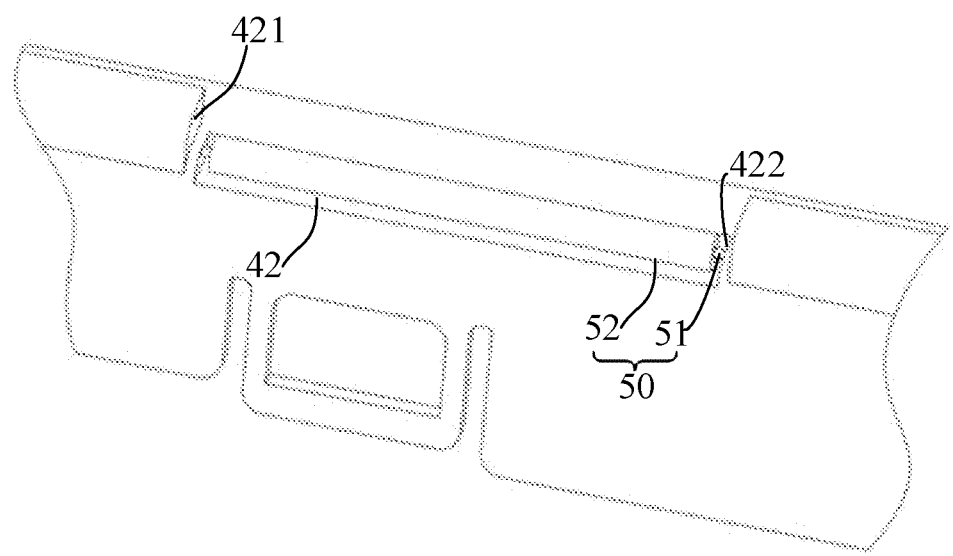
FIG. 4a is a structural schematic view illustrating that a roller is disposed in a concave portion of a frame of the display device provided by the embodiments of the present disclosure.

For example, as shown in FIG. 4a, the frame 40 is provided with a concave portion 42 therein, the concave portion 42 has a first side wall 421 and a second side wall 422 opposite to each other, and two ends of the rotatable shaft 51 of the roller 50 are respectively disposed on the first side wall 421 and the second side wall 422. For example, grooves are disposed in the first side wall 421 and the second side wall 422, and the two ends of the rotatable shaft 51 are respectively embedded into the grooves of the first side wall 421 and the second side wall 422 to dispose the rotatable shaft 51 into the concave portion 42. For example, the rotatable shaft 51 rotates with respect to the grooves, such that it is convenient for the roller 50 to rotate. For example, the rotatable shaft 51 is detachably disposed in the concave portion 42, such that the display device is convenient to be assembled and disassembled.

Figure 4B:
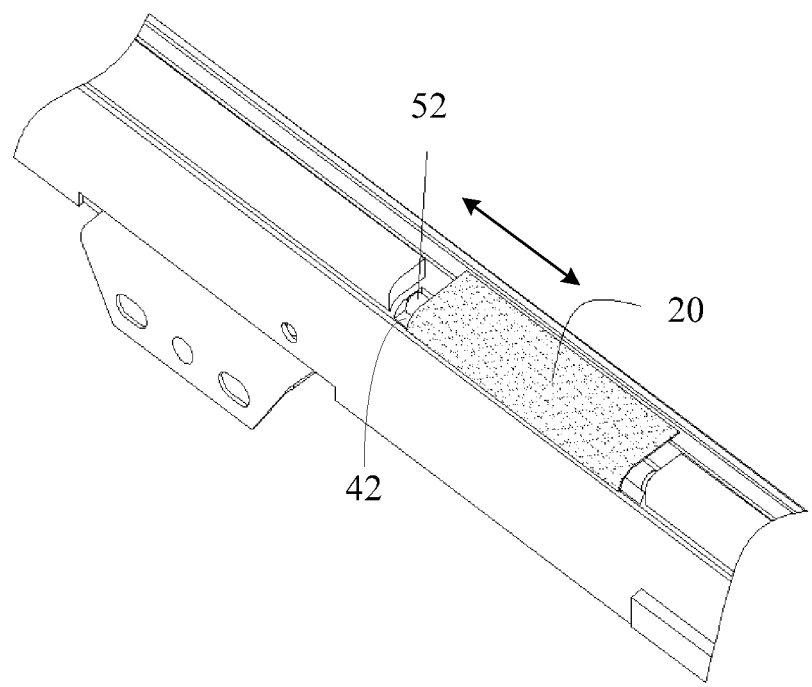
FIG. 4b is a structural schematic view illustrating that the roller and a flexible circuit board are disposed in the concave portion of the frame of the display device provided by the embodiments of the present disclosure.

For example, as shown in FIG. 4b, along an extension direction of the sleeve 52 (as shown by the arrow), a length of the sleeve 52 is greater than that a length of the flexible circuit board 20. By such disposing, the probability of damage of the flexible circuit board 20 is further reduced. In addition, the length of the sleeve 52 is less than a length of the rotatable shaft (not shown in FIG. 4b), such that the sleeve 52 is prevented from being rubbed against the frame in a rolling process.

Figure 4C:
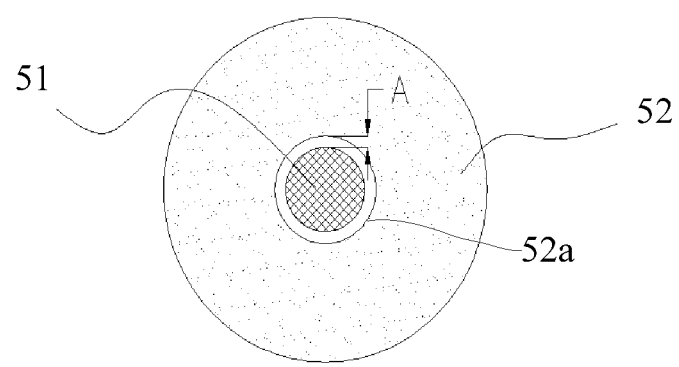
FIG. 4c is a section schematic view illustrating a rotatable shaft and a sleeve of the roller of the display device provided by the embodiments of the present disclosure.

For example, as shown in FIG. 4c, a unidirectional gap A between an inner wall 52a of the sleeve 52 and the rotatable shaft 51 is less than or equal to about 0.2 mm. The unidirectional gap refers to a gap between the inner wall 52a of the sleeve 52 and the rotatable shaft 51 in the case that a center of the sleeve 52 in a radial direction and a center of the rotatable shaft 51 in a radial direction are coincided. By such disposing, a movement space of the sleeve 52 in its radial direction is maximally about 2A=0.4 mm. Therefore, the sleeve 52 is effectively prevented from being collided against the flexible circuit board in the transportation process or the vibration process, thereby effectively reducing the damage to the flexible circuit board and the economic loss. In the other aspect, the maximum movement space of the sleeve 52 in the radial direction thereof is set to be about 0.4 mm, such that difficulty in rolling of the roller caused by an overlarge movement space is avoided.

The embodiments mentioned above explain the roller 50 adopting the rolling wheel structure in detail. Of course, an implementing manner of the roller 50 includes but not limited to the rolling wheel structure. For example, in at least another embodiment, the roller 50 is a rolling ball structure, for example, the rolling ball structure includes a plurality of ratable balls disposed in the concave portion 41 of the frame 40.

In addition, the display device provided by the embodiments of the present disclosure may be any products or parts having a display function, such as a mobile phone, a tablet computer, a television, a display, a laptop computer, a digital photo frame, a navigator and the like.

The embodiments of the present disclosure and the features in the embodiments may be combined in case of no conflict.

The foregoing embodiments merely are exemplary embodiments of the disclosure, and not intended to define the scope of the disclosure, and the scope of the disclosure is determined by the appended claims.

The application claims priority of Chinese Patent Application No. 201610659042.5 filed on Aug. 11, 2016, the disclosure of which is incorporated herein by reference in its entirety as part of the present application.

The invention claimed is:
1. A display device, comprising:
a display panel;
an electronic element, located outside the display panel;
a flexible circuit board, connecting the display panel to the electronic element;
a frame, including a protrusion portion extending out of the display panel, wherein the protrusion portion overlaps with a portion of the flexible circuit board located between the display panel and the electronic element; and
a roller, wherein at a position where the flexible circuit board overlaps with the protrusion portion of the frame, the roller is disposed between the flexible circuit board and the protrusion portion.
2. The display device according to claim 1, wherein the portion of the flexible circuit board located between the display panel and the electronic element spans across the protrusion portion of the frame.

3. The display device according to claim 1, wherein the protrusion portion of the frame includes a surface facing the flexible circuit board, and a distance between the surface and the roller is greater than 0.

4. The display device according to claim 1, wherein in a direction parallel with a main surface of the display panel, the display panel and the electronic element are respectively located on both sides of the protrusion portion of the frame.

5. The display device according to claim 4, wherein in a direction perpendicular to the main surface of the display panel, a top end of the roller is higher than the protrusion portion of the frame.

6. The display device according to claim 1, wherein the roller and the flexible circuit board are in contact.

7. The display device according to claim 6, wherein a tangential line at the position where the roller and the flexible circuit board are in contact faces the electronic element or the display panel.

8. The display device according to claim 1, wherein the roller includes a rotatable shaft disposed on the frame and a sleeve surrounding the rotatable shaft.

9. The display device according to claim 8, wherein the frame is provided with a concave portion therein, the concave portion has a first side wall and a second side wall opposite to each other, and two ends of the rotatable shaft of the roller are respectively disposed on the first side wall and the second side wall.

10. The display device according to claim 8, wherein along an extension direction of the sleeve, a length of the sleeve is greater than a length of the flexible circuit board.

11. The display device according to claim 8, wherein a unidirectional gap between an inner wall of the sleeve and the rotatable shaft is less than or equal to about 0.2 mm.

12. The display device according to claim 8, wherein a material of the sleeve includes polyvinyl chloride or silicone.

13. The display device according to claim 8, wherein a material of the rotatable shaft includes metal.

14. The display device according to claim 1, wherein the protrusion portion of the frame includes a first portion, a second portion and a third portion which are sequentially connected to form a stepwise structure, and the first portion is located between the second portion and the display panel.

15. The display device according to claim 14, wherein the third portion is lower than the first portion and the roller is disposed on the third portion.

16. The display device according to claim 1, wherein the frame further includes a side frame connected to the protrusion portion, and the electronic element is parallel with the side frame.

17. The display device according to claim 1, wherein the protrusion portion of the frame includes a surface facing the flexible circuit board, and a distance between the surface and the roller is equal to 0.

* * * * *